United States Patent [19]

Hollrah et al.

[11] Patent Number: 5,113,803
[45] Date of Patent: May 19, 1992

[54] REDUCTION OF NO$_x$ EMISSIONS FROM GASOLINE ENGINES

[75] Inventors: Don P. Hollrah, Manchester; Denis L. Lenane, St. Louis, both of Mo.

[73] Assignee: Ethyl Petroleum Additives, Inc., St. Louis, Mo.

[21] Appl. No.: 678,649

[22] Filed: Apr. 1, 1991

[51] Int. Cl.$^5$ .................... F02M 25/14; C10L 1/18
[52] U.S. Cl. .................................. 123/1 A; 44/359
[58] Field of Search ............... 123/1 A; 44/359, 360

[56] References Cited

U.S. PATENT DOCUMENTS

| | | | |
|---|---|---|---|
| 3,037,038 | 5/1962 | Johnston et al. | 44/359 |
| 3,112,789 | 12/1963 | Percy et al. | 431/3 |
| 3,127,351 | 3/1964 | Brown et al. | 44/359 |
| 3,926,580 | 12/1975 | Gautreaux | 44/360 |
| 3,996,740 | 12/1976 | Niebylski | 60/299 |
| 4,028,065 | 6/1977 | Sprague et al. | 44/68 |
| 4,061,122 | 12/1977 | Edgar et al. | 123/143 R X |
| 4,082,517 | 4/1978 | Niebylski et al. | 44/360 |
| 4,175,927 | 11/1979 | Niebylski | 44/360 |
| 4,191,536 | 3/1980 | Niebylski | 44/352 |
| 4,240,802 | 12/1980 | Nichols, Jr. | 44/379 |
| 4,266,946 | 5/1981 | Niebylski | 44/360 |
| 4,390,345 | 6/1983 | Somorjai | 44/352 |
| 4,435,187 | 3/1984 | Graiff et al. | 123/1 A X |
| 4,674,447 | 6/1987 | Davis | 123/1 A |
| 4,904,279 | 2/1990 | Kanne et al. | 44/387 |
| 5,004,480 | 4/1991 | Kanne | 44/387 |

FOREIGN PATENT DOCUMENTS 1082462  7/1980  Canada.

OTHER PUBLICATIONS

Faggan et al., "An Evaluation of Manganese as an Antiknock in Unleaded Gasoline", SAE Automobile Engineering Meeting, Detroit, Mich., Oct. 13-17, 1975. 10/13-17/75.

Moran, John B., "The Environmental Implications of Manganese as an Alternate Antiknock", 1975 SAE Automotive Engineering & Manufacturing Meeting, Detroit, Mich., Oct. 15, 1975.

Benson, Jack D., "Manganese Fuel Additive (MMT) Can Cause Vehicle Problems", SAE Fuels & Lubricants Meeting, Tulsa, OK., Jun. 7-9, 1977.

Lenane, D. L., "MMT—A Further Evaluation", SAE Paper No. 770656, Ethyl Corp. Research Laboratories, Ferndale, MI. no date.

Furey, et al., "How MMT Causes Plugging of Monolithic Converters", SAE Paper No. 78004, SAE Congress & Exposition, Detroit, Mich., Feb. 27–Mar. 3, 1978.

(List continued on next page.)

Primary Examiner—Tony M. Argenbright
Attorney, Agent, or Firm—David E. LaRose

[57] ABSTRACT

NO$_x$ emissions are reduced in two stages during operation of an engine equipped with an exhaust gas catalyst system. In the first stage, a reduction in NO$_x$ emissions is effected in the exhaust leaving the combustion chamber. In the second stage a further reduction in NO$_x$ emissions is effected in the exhaust passing through the exhaust catalyst system. Both of the two-stage reductions are brought about in the same way, namely (a) by use of a fuel composition containing at least one fuel-soluble cyclopentadienyl manganese tricarbonyl compound in an amount equivalent to up to 1/32 gram of manganese per gallon of fuel; and (b) by enhancing the NO$_x$ control activity of at least the catalyst by prior operation of the engine on such fuel composition, either intermittently or continuously. Such prior operation constitutes a run-in or conditioning stage of sufficient total duration (continuous or interrupted) so that substantial reductions in NO$_x$ emissions are thereafter continuously achieved in subsequent operation of the engine. The efficacy of the invention was demonstrated by conducting a fleet test involving 48 cars, each operated for 75,000 miles during the test. Dramatic reductions in NO$_x$ were achieved. Moreover, no significant catalyst pluggage, or increase in exhaust gas back pressure, or adverse effect upon oxygen sensors were experienced in the fleet test.

26 Claims, 2 Drawing Sheets

OTHER PUBLICATIONS

Faix, Louis J., "A Study of the Effects of Manganese Fuel Additive Emissions", SAE Paper No. 780002, Chevrolet, Div. General Motors Corp., Warren, MI. 1978, (no month).

Lenane, D. L., "Effect of MMT on Emissions from Production Cars", SAE Paper No. 780003, Ethyl Corp. Research Laboratories, Ferndale, MI 1978 (no month).

Lichtenstein, et al., "MMT Plugging of Oxidation Catalysts on Ceramic & Metal Supports During Engine Dyno Studies of Catalyst Durability", SAE Paper No. 780005, Matthey Bishop, Inc., Malvern, PA, 1978 (no month).

Williamson, et al., "Effects of Fuel Additive MMT on Contaminant Retention & Catalyst Performance", SAE Paper No. 821193, Ford Motor Co., Fuels & Lubricants Meeting, Toronto, Ontario, Canada Oct. 18-21, 1982.

Otto et al., "Effectgs of Mn Deposits from MMT on Automotive Catalysts in the Absence and Presence of Other Fuel Additives", *Environmental Science & Technology*, vol. 12, No. 2, (pp. 181-184), Feb. 1978.

Bailie, et al., "MMT-A Versatile Antiknock", Ethyl Corporation Paper No. AM-78-36, no date.

REDUCTION OF NO$_x$ EMISSIONS FROM GASOLINE ENGINES

TECHNICAL FIELD

This invention relates to methods and means for reducing the amount of nitrogen oxides emitted into the atmosphere during the operation of spark-ignition internal combustion engines (often referred to quite simply as gasoline engines).

BACKGROUND

As is well known, the operation of gasoline engines results in the release into the atmosphere of undesirable quantities of nitrogen oxides (generally referred to as NO$_x$). In order to ameliorate this adverse situation, considerable effort has been devoted to the development of catalyst systems to control the amount of NO$_x$ emitted by gasoline engines, and especially by motor vehicles powered by gasoline engines. The most recent developments in the field involve the development of so-called three-way catalysts—i.e., catalysts which are designed to control the emission of NO$_x$, carbon monoxide, and unburned hydrocarbons. While such catalysts can be pelletized catalysts, the type of exhaust gas catalysts currently preferred in the art are the monolithic catalysts. For further details concerning such developments, reference may be had, for example, to Kirk-Othmer, *Encyclopedia of Chemical Technology*, John Wiley & Sons, Volume 5, copyright 1979, pages 48–50, and references cited therein (listed on page 56 thereof).

THE INVENTION

Despite the improvements brought about by use of exhaust gas catalysts, there exists a need to still further reduce the amount of NO$_x$ emitted into the environment during operation of spark-ignition internal combustion engines. This invention is deemed to fulfill this need in a remarkably effective manner without imposing any significant economic penalties on the engine operator or the gasoline producer. Moreover, the practice of this invention does not require modification of engine design or changes in the design and composition of present-day exhaust gas catalysts. And significantly, this invention enables conservation of worldwide petroleum resources and can contribute to improvements in public health and well being.

This invention involves, inter alia, the discovery that NO$_x$ emissions can be reduced in two stages during engine operation. In the first stage, a reduction in NO$_x$ emissions can be effected in the exhaust leaving the combustion chamber. In the second stage a further reduction in NO$_x$ emissions can be effected in the exhaust passing through the exhaust catalyst system. Moreover both of the two-stage reductions can be brought about in the same way, namely by use of a suitable fuel composition pursuant to this invention. It has also been discovered that the foregoing two-stage reduction in NO$_x$ emissions begins to occur after the engine has been operated in accordance with this invention for a total or cumulative period of time such that beneficial enhancements in NO$_x$ control occur both in, and/or in proximity to, the combustion chamber and, in addition, in the exhaust catalyst system. Once this run-in or conditioning period has taken place, both NO$_x$ reduction stages can function concurrently during engine operation in accordance with this invention. As a consequence of this two-stage NO$_x$ reduction, the extent to which NO$_x$ is released to the atmosphere by the operating engine is significantly less than would be experienced if the engine were not fitted, fueled and operated in accordance with this invention.

To accomplish such NO$_x$ reductions, a spark-ignition internal combustion engine, preferably a multicylinder internal combustion engine, is provided with (i) a supply of liquid fuel for the operation of said engine, and (ii) an exhaust gas catalyst for controlling the amount of pollutants released to the environment via the engine exhaust after the exhaust has contacted said catalyst. The catalyst is usually composed of a noble metal (Pt and/or Pd) or oxide thereof finely dispersed and stably supported on a suitable inorganic carrier having a high surface area, such as gamma-alumina, zeolite, or silica. Such catalysts are predominantly oxidation-type catalysts, and can be used in pelletized form, but preferably are in monolithic form. The more preferred catalysts are three-way conversion catalysts, which can be either a single bed catalyst or a dual-catalyst bed system. Most preferred is a monolithic three-way conversion catalyst system comprising an oxygen sensor, fuel injection apparatus and an electronic feedback-controlling system to maintain the air/fuel ratio at a preselected value or band of values. For further details concerning catalysts for exhaust gas purification, reference should be made to O. Hirao and R. K. Pefley, *Present and Future Automotive Fuels*, John Wiley & Sons, Inc., Copyright 1988, especially Chapter Eight at pages 486 through 543, and the references cited therein at pages 562–564 of the same book, the disclosures of all of which are incorporated herein by reference. The fuel supplied to the engine contains at least one fuel-soluble cyclopentadienyl manganese tricarbonyl compound in an amount equivalent to up to 1/32 gram of manganese per gallon (approximately 0.0083 gram of manganese per liter), preferably in an amount in the range of about 1/125 and about 1/40 gram of manganese per gallon (i.e., in the range of about 0.0021 and about 0.0066 gram of manganese per liter), and more preferably in an amount in the range of about 1/500 and about 1/125 gram of manganese per gallon (i.e., in the range of about 0.0005 and about 0.0021 gram of manganese per liter); the engine is operated with an excess of air relative to the fuel introduced into the combustion chamber; and the exhaust from the combustion of such fuel is caused to come into direct contact with the exhaust gas catalyst at an elevated temperature so that after a suitable total period of engine operation in this manner, the NO$_x$ control activity of the catalyst is enhanced by the prior operation of the engine on fuel containing at least one fuel-soluble cyclopentadienyl manganese tricarbonyl compound in an amount equivalent to up to 1/32 gram of manganese per gallon of fuel. Such combination of materials and operational procedures gives rise to a reduction in the quantity of nitrogen oxides in the exhaust emitted into the environment during the operation of the engine equipped and operated in this manner.

As noted above, the practice of this invention results in a two-stage reduction in NO$_x$ emissions. The initial reduction of these sequential reductions in nitrogen oxide emissions is in the so-called "engine-out" emissions, i.e., the emissions in the exhaust gas as it leaves the combustion chamber on its way toward the exhaust gas catalyst. This reduction of NO$_x$ is in relation to the quantity of NO$_x$ that would be in the engine-out exhaust if the same engine were being operated on the same fuel but without said tricarbonyl compound. In other words, this engine-out reduction can be thought of as a reduction brought about by a beneficial modification in the combustion process within the combustion chamber caused by or resulting from the presence of the very small concentration of the manganese tricarbonyl compound in the incoming fuel-air charge. The mechanism by which this reduction is caused is unknown. However, it has been observed that the engine-out $NO_x$ reduction depends upon prior operation of the engine on fuel containing the manganese additive. It is thus conceivable that the engine-out reduction in $NO_x$ results at least in part from conditioning combustion chamber surfaces in a beneficial manner by operating the engine on the manganese-containing fuel intermittently or continuously for a suitable cumulative or total period of time. Thereafter the so-conditioned combustion chamber and the incoming manganese-containing fuel cooperate to reduce the engine-out $NO_x$ emissions to a very significant extent.

The second-stage or further reduction in nitrogen oxide emissions occurs during the time the engine exhaust travels over, through and/or otherwise in direct contact with the hot exhaust gas catalyst, and is deemed to result from a catalyst enhancement brought above by prior usage in the engine of fuel containing a cyclopentadienyl manganese tricarbonyl compound. In other words, the manganese additive is believed to increase the effectiveness of the catalyst in the control of $NO_x$ emissions by forming a small quantity of a catalytically effective residue on or in the catalyst. Yet because the manganese additive is present in such small concentrations in the fuel, the amount of residues formed on or in the catalyst is insufficient to cause unacceptable catalyst pluggage. The net result from the two-staged $NO_x$ reduction is a reduction of $NO_x$ in the so-called "tailpipe emissions", i.e., the emissions in the engine exhaust downstream from the exhaust gas catalyst. Tailpipe emissions can also be termed "catalyst out" emissions. This total reduction in $NO_x$ emissions is in relation to the quantity of nitrogen oxides that would be in the tailpipe exhaust from the same engine after contacting the same catalyst operated on the same fuel except that the fuel at no time contained a cyclopentadienyl manganese tricarbonyl compound.

Thus, among the various embodiments of this invention is the combination of a spark-ignition internal combustion engine, a supply of liquid fuel for the operation of such engine, and an exhaust gas catalyst for controlling the amount of pollutants released to the environment via the engine exhaust after the exhaust has contacted such catalyst, this combination being characterized in that:

a) the fuel contains at least one fuel-soluble cyclopentadienyl manganese tricarbonyl compound in an amount equivalent to up to 1/32 gram of manganese per gallon; and b) the $NO_x$ control activity of the catalyst has been enhanced by prior operation of the engine on fuel containing at least one fuel-soluble cyclopentadienyl manganese tricarbonyl compound in an amount equivalent to up to 1/32 gram of manganese per gallon of fuel;

such that there is a reduction in the quantity of nitrogen oxides in the exhaust emitted during the operation of the engine. The catalyst is preferably a three-way catalyst or a monolithic catalyst, and most preferably a three-way monolithic catalyst. Preferred combinations of this type are further characterized in that during operation, the combination causes a reduction in both engine-out $NO_x$ and catalyst-out $NO_x$ emissions.

Other embodiments of this invention include a motor vehicle (e.g., automobile, truck, van, bus, motorcycle, etc.) equipped with a spark-ignition internal combustion engine, a supply of liquid fuel for the operation of the engine, and an exhaust gas catalyst for controlling the amount of pollutants in the engine exhaust released to the environment, the fuel containing at least one fuel-soluble cyclopentadienyl manganese tricarbonyl compound in an amount equivalent to up to 1/32 gram of manganese per gallon of fuel, and such vehicle having been previously operated on fuel containing at least one fuel-soluble cyclopentadienyl manganese tricarbonyl compound in an amount equivalent to up to 1/32 gram of manganese per gallon of fuel to enhance the activity of the catalyst in controlling $NO_x$ emissions. Preferred combinations of this type include those wherein the catalyst is a three-way catalyst, a monolithic catalyst or a monolithic three-way catalyst; and wherein during operation of the vehicle there are reductions in the quantity of engine-out $NO_x$ and in the quantity of tailpipe $NO_x$ emissions.

This invention also provides a method of reducing the quantity of $NO_x$ emitted during the operation of a motor vehicle equipped with a spark-ignition internal combustion engine, an exhaust gas catalyst and a gasoline tank for holding and dispensing to the engine a liquid fuel for use in the operation of the vehicle, which method comprises periodically providing to such tank a supply of liquid fuel containing at least one fuel-soluble cyclopentadienyl manganese tricarbonyl compound in an amount equivalent to up to 1/32 gram of manganese per gallon such that there is a reduction in engine-out $NO_x$, and causing such vehicle to be periodically operated on liquid fuel containing at least one fuel-soluble cyclopentadienyl manganese tricarbonyl compound in an amount equivalent to up to 1/32 gram of manganese per gallon for at least a cumulative period of time such that there is a reduction in the tailpipe $NO_x$ emissions from such vehicle. Preferably, the vehicle is caused to be periodically operated on liquid fuel containing at least one fuel-soluble cyclopentadienyl manganese tricarbonyl compound in an amount equivalent to up to 1/32 gram of manganese per gallon for at least a cumulative period of time such that the reduction in the tailpipe $NO_x$ emissions from the vehicle becomes at least equivalent to the reduction in engine-out $NO_x$.

In each of the above embodiments of this invention the most preferred cyclopentadienyl manganese tricarbonyl compound for use therein is methylcyclopentadienyl manganese tricarbonyl.

The above and other embodiments of this invention will be still further apparent from the ensuing description, accompanying drawings, and appended claims.

THE DRAWINGS

FURTHER DESCRIPTION

Figure 1:
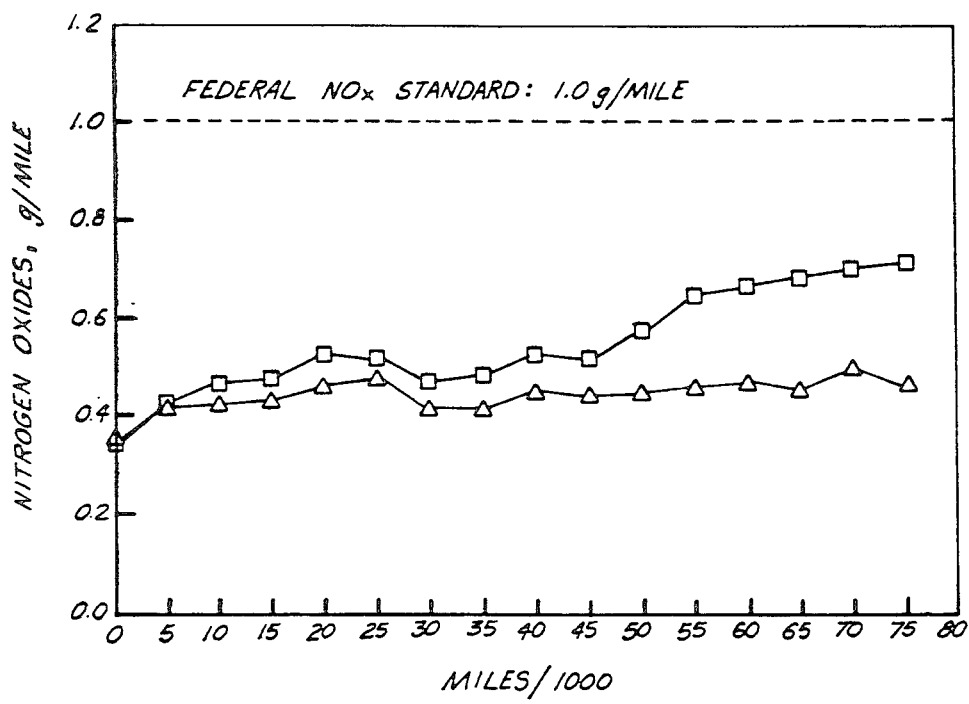
FIG. 1 is a plot of weighted average nitrogen oxides tailpipe emissions illustrating advantages achieved by the practice of this invention.

The gasolines of this invention are lead-free in the sense that no organolead antiknock agent is blended into the fuel. If any trace amounts of lead are present, such amounts are due exclusively to contamination in the system in which the fuels are formed, blended, stored, transported or dispensed.

The hydrocarbonaceous gasoline base stocks that can be used in forming the gasoline blends include straight run stocks, light naphtha fractions, cracked gasoline stocks obtained from thermal or catalytic cracking, hydrocracking, or similar methods, reformate obtained by catalytic reformation or like processes, polymer gasolines formed via polymerization of olefins, alkylates obtained by addition of olefins to isobutane or other hydrocarbons by alkylation processes, isomerates formed by isomerization of lower straight chain paraffins such as n-pentane, n-hexane, n-heptane, and the like, and other hydrocarbons of the gasoline boiling range formed by suitable refinery processing operations. Suitable amounts of appropriate hydrocarbons formed by other methods such as production from coal, shale or tar sands can be included, if desired. For example reformates based on liquid fuels formed by the Fischer-Tropsch process can be included in the blends. In all cases however, the resultant gasoline will possess the distillation characteristics typical of conventional regular, midgrade, premium, or super-premium unleaded gasolines. For example, the motor gasolines are generally within the parameters of ASTM D 4814 and typically have initial boiling points in the range of about 70° to about 115° F. and final boiling points in the range of about 370° to about 440° F. as measured by the standard ASTM distillation procedure (ASTM D 86). Intermediate fractions boil at intermediate temperatures. The hydrocarbon composition of gasolines according to volume percentages of saturates, olefins, and aromatics is typically determined by ASTM test procedure D 1319.

Generally, the base gasoline will be a blend of stocks obtained from several refinery processes. The final blend may also contain hydrocarbons made by other procedures such as alkylates made by the reaction of $C_4$ olefins and butanes using an acid catalyst such as sulfuric acid or hydrofluoric acid, and aromatics made from a reformer.

The saturated gasoline components comprise paraffins and naphthenes. These saturates are generally obtained from: (1) virgin gasoline by distillation (straight run gasoline), (2) alkylation processes (alkylates), and (3) isomerization procedures (conversion of normal paraffins to branched chain paraffins of greater octane quality). Saturated gasoline components also occur in so-called natural gasolines. In addition to the foregoing, thermally cracked stocks, catalytically cracked stocks and catalytic reformates contain some quantities of saturated components. In accordance with preferred embodiments of this invention, the base gasoline blend contains a major proportion of saturated gasoline components.

Olefinic gasoline components are usually formed by use of such procedures as thermal cracking, and catalytic cracking. Dehydrogenation of paraffins to olefins can supplement the gaseous olefins occurring in the refinery to produce feed material for either polymerization or alkylation processes. In order to achieve the greatest octane response to the addition of the cyclopentadienyl manganese tricarbonyl antiknock compound, the olefins, if used in the fuel blends, should be substantially straight chain 1-olefins such as 1-heptene, 1-octene, 1-nonene, 1-decene, and the like. Olefins of this type have been reported to exhibit good antiknock response to cyclopentadienyl manganese tricarbonyls—see Brown and Lovell, *Industrial and Engineering Chemistry*, Volume 50, No. 10, October 1958, pages 1547-50.

In accordance with preferred embodiments of this invention, the amount of olefinic hydrocarbons in the fuel composition can be controlled so as to be less than about 15% by volume (and more preferably to less than about 10% by volume and most preferably to less than 5% by volume) and, in addition, oxygenated fuel-blending components (e.g., hydrocarbyl ethers) of suitable distillation characteristics can be included in the fuel. In order to still further improve the fuel compositions from the environmental standpoint, the fuel composition should be blended from components such that the Reid vapor pressure (ASTM test method D-323) is 9.0 psi or less and most preferably 8.0 psi or less. In this way the evaporative losses of the fuel into the atmosphere during storage and fueling operations can be effectively reduced. As is well known, Reid vapor pressures are determined at 100° F. (37.8° C.).

The gasoline base stock blends with which the cyclopentadienyl manganese tricarbonyl additive is blended pursuant to this invention will generally contain about 40 to 90 volume % of saturates, up to 30 (and preferably less than 10 and more preferably less than 5) volume % olefins, and up to about 45 volume % aromatics. Preferred gasoline base stock blends for use in the practice of this invention are those containing no more than 40% by volume of aromatics, more preferably no more than 30% by volume of aromatics, still more preferably no more than 28% by volume of aromatics, and most preferably no more than 25% by volume of aromatics. Preferably, the overall fuel blend will contain no more than 1% by volume and most preferably no more than 0.8% by volume of benzene.

Particularly preferred unleaded gasolines produced and/or utilized in the practice of this invention are characterized by having (1) a maximum sulfur content of 300 ppm, (2) a maximum bromine number of 20, (3) a maximum aromatic content of 20% by volume, (4) a maximum content of benzene of 1% by volume, and (5) a minimum content of contained oxygen of 1% by weight in the form of at least one alcohol, monoether or polyether, such gasoline having dissolved therein up to 1/32 gram of manganese per gallon as methylcyclopentadienyl manganese tricarbonyl. Gasolines of this type not containing the manganese additive are sometimes referred to as reformulated gasolines. See for example *Oil & Gas Journal*, Apr. 9, 1990, pages 43–48.

Typically the content of oxygenates in the fuel is equivalent to up to about 2.7 weight percent of oxygen in the fuel. Methods for the production of suitable oxygenated blending components are described in the literature. See for example U.S. Pat. Nos. 4,988,366 and 4,990,712, and published European patent applications EP 410,689 and 410,690, all of which disclosures are incorporated herein by reference.

From the standpoint of octane quality, the preferred gasoline base stock blends are those having an octane rating of $(R+M)/2$ ranging from 78-95.

Any of a variety of cyclopentadienyl manganese tricarbonyl compounds can be used in the practice of this invention. Reference may be had, for example, to U.S. Pat. No. 2,818,417, all disclosure of which is incorporated herein by reference, for a description of suitable cyclopentadienyl manganese tricarbonyl compounds and their preparation. Illustrative examples of the manganese compounds which can be utilized in accordance with this invention include cyclopentadienyl manganese tricarbonyl, methylcyclopentadienyl manganese tricarbonyl, dimethylcyclopentadienyl manganese tricarbonyl, trimethylcyclopentadienyl manganese tricarbonyl, tetramethylcyclopentadienyl manganese tricarbonyl, pentamethylcyclopentadienyl manganese tricarbonyl, ethylcyclopentadienyl manganese tricarbonyl, diethylcyclopentadienyl manganese tricarbonyl, propylcyclopentadienyl manganese tricarbonyl, isopropylcyclopentadienyl manganese tricarbonyl, tert-butylcyclopentadienyl manganese tricarbonyl, octylcyclopentadienyl manganese tricarbonyl, dodecylcyclopentadienyl manganese tricarbonyl, ethylmethylcyclopentadienyl manganese tricarbonyl, indenyl manganese tricarbonyl, and the like, including mixtures of two or more such compounds. Generally speaking, the preferred compounds or mixtures of compounds are those which are in the liquid state of aggregation at ordinary ambient temperatures, such as methylcyclopentadienyl manganese tricarbonyl, ethylcyclopentadienyl manganese tricarbonyl, liquid mixtures of cyclopentadienyl manganese tricarbonyl and methylcyclopentadienyl manganese tricarbonyl, mixtures of methylcyclopentadienyl manganese tricarbonyl and ethylcyclopentadienyl manganese tricarbonyl, etc. The most preferred compound because of its commercial availability and its excellent combination of properties and effectiveness is methylcyclopentadienyl manganese tricarbonyl.

As an example of the practice and advantages of this invention, a fleet test was conducted to investigate the effect of methylcyclopentadienyl manganese tricarbonyl (MMT) on exhaust emissions form production cars. The fleet consisted of 48 cars—six cars each of eight models representing more than 50% of 1988 U.S. sales. Three of each model were tested for 75,000 miles using the base fuel. The other three used the base fuel plus 0.03125 gram of manganese per gallon as MMT. Neither fuel contained any other additives.

The primary objective of this program was to determine if an emission difference occurred in use due to the addition of of the additive in unleaded gasoline. Howell EEE fuel was selected as the mileage accumulation gasoline because:

1. It is consistent in quality and readily available.
2. It has high octane quality—92.1 (R+M)/2. None of the cars was expected to experience knock on this fuel.
3. It is widely used for emission test work.

Howell EEE fuel has a normal Reid vapor pressure of approximately 9 psi and thus would not be expected to give canister loading problems during emission testing. Specifications and typical properties for the fuel used in the test program are given in Table 1.

TABLE 1

| Property | ASTM Method | Certification Fuel Specifications Min. | Certification Fuel Specifications Max. | Typical Properties |
|---|---|---|---|---|
| Gravity, °API | D1298 | — | — | 59.2 |
| Reid Vapor Pressure, psi | D323 | 8.7 | 9.2 | 9.2 |
| Sulfur, wt % | D3120 | — | 0.10 | 0.001 |
| Lead, g/gal | D3237 | 0.0 | 0.05 | 0.001 |
| Phosphorus, g/gal | D3120 | — | 0.10 | Nil |
| Distillation, °F. | D86 | | | |
| IBP | | 75 | 95 | 92 |
| 10% | | 120 | 135 | 128 |
| 50% | | 200 | 230 | 218 |
| 90% | | 300 | 325 | 313 |
| End Point | | | 415 | 373 |
| Hydrocarbon Composition | D1319 | | | |
| Aromatics, vol % | | — | 35 | 31.7 |
| Olefins, vol % | | — | 10 | 1.8 |
| Saturates, vol % | | — | — | 66.5 |
| Existent Gum, mg/100 ml | D381 | — | — | 0.08 |
| Copper Strip Corrosion | D130 | — | — | 1 |
| Research Octane Number | D2699 | | | |
| Clear | | 93.0 | — | 96.5 |
| Plus Mn* | | — | — | 97.4 |
| Motor Octane Number | D2700 | | | |
| Clear | | — | — | 87.7 |
| Plus Mn* | | — | — | 88.0 |
| (R + M)/2 | | | | |
| Clear | | — | — | 92.1 |
| Plus Mn* | | — | — | 92.7 |

*0.03125 g Mn/gal as MMT. Fuel used in the test program within the minimum and maximum specifications specified in this table. Because the MMT additive has an effect only on octane quality, specifications for Howell EEE remain the same with the addition of MMT, except for RON, MON, and (R + M)/2.

As noted above, half of the test fleet cars (24) were run on clear Howell EEE fuel, with the other cars (24) run on Howell EEE plus 0.03125 gram of manganese per gallon as MMT.

For emission testing, use was made of the Federal Test Procedure (FTP) developed by the EPA for vehicle emission certification under the Clean Air Act. A few minor changes were made in the FTP test protocol because the program was designed to compare the performance of the emission system when different fuels are used, not to certify the emission control system.

Emission tests were performed using a constant volume sampler (CVS) according to FTP-75 guidelines. All duplicate emission test data were obtained using the same CVS system and chassis dynamometers. Two test sites cross-checked analytical equipment performance using a common standard reference gas. Engine emission data were obtained at the 50,000-mile and 75,000-mile points in order to obtain converter efficiency data.

The diurnal heat soak prior to each emission test was not performed. The common use of Howell EEE as the base mileage accumulation fuel and the emission system test fuel negated such a need. Additionally evaporative emissions testing was not performed at each 5,000-mile test point.

The test fleet used the normal maintenance schedules as outlined in the car models owner's manual. Although the type of driving in the mileage accumulation is considered "normal service", the schedules were adjusted as required by good maintenance "service". For example, air filters normally are changed each 30,000 miles. However, early experience with the cars run on the road route indicated that filters needed to be changed each 15,000 miles, primarily due to the high dirt levels in construction areas. Oil and oil filters were changed at specified intervals. Transmission fluids were replaced if the color or smell indicated fluid stress.

During this 50,000-mile investigation, a decision was made to continue the test to 75,000 miles. In the 50,000- to 75,000-mile period, there was very little unscheduled maintenance except where component failure occurred.

In this program, which covered 48 cars tested through 75,000 miles, there were approximately 2,500 emission tests. Of this number, fewer than 30 were rejected as invalid.

The exhaust emission data generated in this test were subjected to statistical analysis by two independent companies—Roberson-Pitts, Inc., in Raleigh, N.C., and Systems Applications, Inc., in San Rafael, Calif. Both analyses showed that the test fleet met the EPA criteria for cause or contribution, as outlined in Section 211.

Where engine or component failure occurred, or a problem with vehicle operations was noted, the on-site manager could request additional testing. Also, cars would be tested after any emission-related component was changed by the car dealer service organization.

Mileage accumulation began in the July-August period in 1988 and ended in the January-February period in 1990.

The results of the statistical analysis on nitrogen oxide emissions are summarized in the following discussion and are depicted in FIG. 1.

As shown in FIG. 1, $NO_x$ emissions with the additive fuel are much lower than those with clear fuel. On a weighted-average basis, both groups of cars meet the current 1.0 g/mile standard.

Mean integrated $NO_x$ emissions are shown in Table 2. The improvement in $NO_x$ began at 5,000 miles and continued throughout the test. Obviously, the difference in $NO_x$ emissions is statistically significant and, as will be shown hereinafter, is a result of less loss in converter effectiveness.

TABLE 2

| | Nitrogen Oxides Emissions Mean Integrated Emissions | | |
|---|---|---|---|
| | $NO_x$ Emissions, g/mile | | |
| Miles | MMT | Clear | Delta (MMT-Clear) |
| 1-50 K | 0.42 | 0.49 | -0.07 |
| 1-75 K | 0.43 | 0.55 | -0.11 |

The deterioration rates for $NO_x$ were determined using quadratic regression. It became obvious that a quadratic regression would represent a better fit of the data than a straight-line linear regression.

The deterioration rate at any mileage point is estimated as the slope of the regression curve at that mileage. The estimated rates are shown in Table 3, which show improvement in deterioration rates on $NO_x$.

TABLE 3

| Estimated Deterioration Rates | | |
|---|---|---|
| | Fuel | |
| | EEE | MMT |
| Deterioration Rate/10,000 miles | | |
| 25,000 Miles | 0.04 | 0.01 |
| 50,000 Miles | 0.05 | 0.01 |
| 75,000 Miles | 0.06 | 0.01 |
| Deterioration Factor | 1.85 | 1.29 |
| Quadratic Coefficient | 0.00 | -0.00 |

In Table 3, the deterioration factor is the fitted (from the quadratic regression) 75,000-mile emission rate divided by the fitted 4,000-mile emission rate. The quadratic coefficient is the rate of change (decrease) in the deterioration rate.

Several emission components were checked at the 50,000-mile point to determine if these components would have an effect on emissions differences. For example, new fuel injectors were installed in all the multiport cars. This was done to determine if the nondetergent fuel had resulted in a deterioration in emission control. In one model, installation of new fuel pumps and fuel injectors resulted in a large difference in emissions from some cars. The results of this study are summarized in Table 4.

TABLE 4

| Average Effects of MMT to 75,000 Miles | | |
|---|---|---|
| Average Integrated $NO_x$ Emissions 1,000 to 75,000 Miles, g/mile | | |
| EEE | MMT | MMT Effect, g/mile |
| 0.55 | 0.43 | -0.11 |
| After Adjustment for Component Change Effects | | |
| 0.55 | 0.43 | -0.12 |

The statistical analysis conclusions for the first 50,000 miles can be summarized as follows:
a) There is no significant adverse effect of the additive on deterioration for $NO_x$.
b) There is no significant adverse effect of the additive on the estimated mileage at which the standard is first exceeded for $NO_x$.
c) There is no significant adverse effect of the additive on the estimated maximum percentage of vehicles failing the standard over 50,000 miles for $NO_x$.
d) There is no significant adverse effect of the additive on the increase in emissions from initial mileage (1,000 miles) to 50,000 miles for $NO_x$.
e) The change in emissions from initial mileage (1,000 miles) to 5,000 miles is not significantly greater for the additive-fueled cars for $NO_x$.
f) The integrated emissions above initial levels from initial mileage (1,000 miles) to 50,000 miles is not significantly higher for the additive-fueled car for $NO_x$.
g) No adverse effects were detected in the additive-fueled cars for $NO_x$ in any of the statistical tests applied. In fact, $NO_x$ emissions were substantially lowered in cars fueled with the additive. The statistical results imply that the use of the additive would result in statistically significant reductions in $NO_x$ emissions.

Stated more simply and directly—and eliminating the linguistic protocol employed for statistical analysis—the above conclusions boil down to the fact that practice of this invention resulted in substantial reductions in $NO_x$ emissions.

To determine what impact, if any, use of the additive would have on the durability of emission control system components, the following investigations were conducted:

A series of evaluations was undertaken to determine if the additive affects the performance of oxygen sensors. After all cars of a model group in the test fleet had reached 50,000 miles and the necessary emissions test for that mileage had been completed satisfactorily, the oxygen sensors were carefully removed from each car.

A car from each model group fueled with clear Howell EEE and which gave the most repeatable emissions ratings was selected as the "test bed" car. It was used as the common source of engine emissions for comparing the performance of all of the oxygen sensors from that model group. The oxygen sensors in those "test bed" cars were replaced in sequence by sensors from the other cars of like model in the test fleet. Tailpipe emission were then measured.

The mean differences in $NO_x$ emissions between that sensors operated on the additive fuel and those operated on Howell EEE clear fuel are shown in Table 5 for the various car models. These data show that there is no significant difference between the two groups of sensors at the 95% confidence level as determined by the standard T-test statistical method.

TABLE 5

Summary of Oxygen Sensor Evaluation*

| Model | Nitrogen Oxides Mean Diff.⁻ | Stat Sign** |
|---|---|---|
| C | −0.009 | No |
| D | −0.040 | No |
| E | −0.030 | No |
| F | −0.109 | No |
| G | −0.173 | No |
| H | −0.027 | No |
| I | −0.011 | No |
| T | −0.043 | No |

*"Test bed" vehicle tailpipe emission with sensors run on MMT sensors run compared to sensors on Howell EEE
⁻ Mean difference in g/mile after sensors used for 50,000 miles
**Statistical significance at the 95% confidence level This analysis demonstrated that the benefit of $NO_x$ reduction by use of this invention was not a result of oxygen sensor aging since all sensors operated the same.

An automobile catalytic converter is designed to greatly reduce exhaust emissions of HC, CO and $NO_x$. To determine whether the additive had an effect on the performance of catalytic converters in cars, special tests were conducted on the test cars at 1000, 50,000 and 75,000 miles. To do this, a mini-type CVS unit that was developed for CVS-type measurements of engine-out emissions was used. See Randall et al, *Simultaneous Measurement of Engine-out and Tail Pipe Mass Emissions*, SAE Paper 790705.

Data shown in Table 6 show that the additive fuel improves conversion efficiency for $NO_x$ when compared with cars operated on the clear fuel.

TABLE 6

Catalyst Conversion Efficiency Nitrogen Oxides

| Car Model | FUEL | Efficiency % 1,000 Miles | 50,000 Miles | 75,000 Miles |
|---|---|---|---|---|
| C | Additive | 96.0 | 89.5 | 89.4 |
|   | Clear | 95.9 | 84.3 | 83.9 |
| D | Additive | 74.9 | 75.0 | 75.4 |
|   | Clear | 74.2 | 76.7 | 77.2 |
| E | Additive | 91.6 | 79.1 | 80.7 |
|   | Clear | 92.8 | 77.2 | 77.6 |
| G | Additive | 84.2 | 77.3 | 77.0 |
|   | Clear | 86.9 | 77.3 | 75.9 |
| H | Additive | 67.3 | 66.4 | 74.1 |
|   | Clear | 73.3 | 67.3 | 65.7 |
| I | Additive | 85.8 | 80.7 | 81.7 |
|   | Clear | 87.5 | 76.0 | 75.7 |
| T | Additive | 84.4 | 80.8 | 84.3 |
|   | Clear | 83.4 | 77.0 | 80.9 |
| Fleet | Additive | 83.5 | 78.4 | 80.4 |

TABLE 6-continued

Catalyst Conversion Efficiency Nitrogen Oxides

| Car Model | FUEL | Efficiency % 1,000 Miles | 50,000 Miles | 75,000 Miles |
|---|---|---|---|---|
|   | Clear | 84.9 | 76.5 | 76.7 |

Note: All models run on clear fuel to 1,000 miles

Conversion efficiency was determined for all cars except car model F. The close-coupled catalysts in car model F precluded conversion efficiency measurements on this group of cars.

Because all cars were operated on the control gasoline for the first 1,000 miles, this provided a base comparison point to determine the effect of the additive fuel versus the clear fuel on catalyst conversion efficiency at 50,000 and 75,000 miles. However, conversion efficiency at 1,000 miles for the three cars within a model group to be operated on fuel containing the additive could be slightly different from the conversion efficiency for the three cars operating on clear fuel. To compensate for this difference, the "loss in efficiency" from 1000 miles to 50,000 and 75,000 miles, respectively was calculated.

The catalytic converter performance on $NO_x$ presented as "loss in efficiency" from the 1,000-mile point was 8.2 percent loss for the clear fuel and only 3.1 percent for the MMT fuel. Thus the additive fuel does not have a deleterious effect on catalyst conversion efficiency. In fact, the data indicates that the additive fuel enhances the ability of the catalyst to convert $NO_x$ emissions when compared to the clear fuel, and this effect increases between 50,000 and 75,000 miles. This benefit is probably due to the manganese oxides on the catalyst, which assist in reducing the nitrogen oxides. See Edwards et al, *Environmental Science and Technology*, June 1979.

Figure 2:
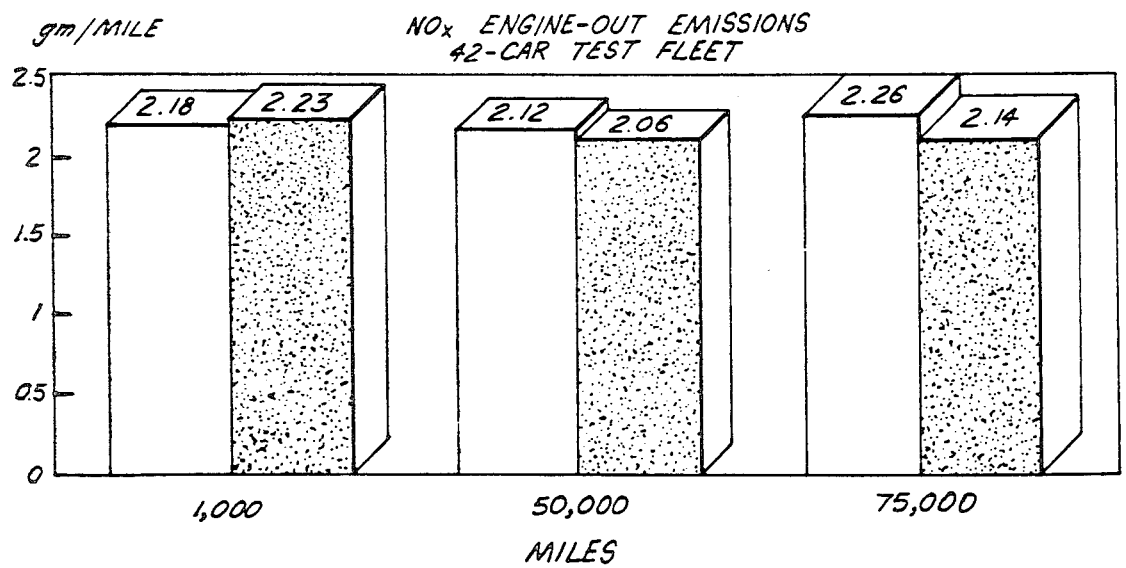
FIG. 2 is a block diagram illustrating the reductions in $NO_x$ engine-out emissions achievable by the practice of this invention.

In order to determine the converter efficiency at 1000, 50,000 and 75,000 miles it was necessary to determine the base engine emissions (called "engine-out" emissions). This data is summarized in FIG. 2. It will be seen that utilization of a manganese-containing fuel pursuant to this invention resulted in a significant reduction in $NO_x$ emissions whereas utilization of the additive-free fuel in the same manner resulted in an increase in $NO_x$ emissions. In fact, the difference in engine-out $NO_x$ emissions attributable to the practice of this invention after 74,000 miles of operation amounted to a reduction of 0.17 grams of $NO_x$ per mile. That is, the additive-free fuel gave an increase of from 2.18 to 2.26 grams of $NO_x$ per mile whereas the additive-containing fuel gave a decrease of from 2.23 to to 2.14 grams of $NO_x$ per mile.

Manganese in the additive is converted primarily to $Mn_3O_4$ in an engine. While the quantity of manganese in gasoline is small, it was desired to determine whether manganese oxides might contribute to catalyst plugging. To determine whether the additive tends to plug emission systems, measurements were made of exhaust back pressure on the test cars (i.e., total pressure ahead of the catalyst). This measurement represents the restriction generated by the catalyst and the acoustic components of the exhaust system. All cars, except those in car model group F, were tested for back pressure after 75,000 miles of service. Car model F was not tested because a pressure gauge tap could not be installed.

Pressure on the exhaust system was measured at an engine speed of 4500 rpm and wide open throttle (WOT). The data are summarized in Table 7. There was no statistically significant difference in exhaust system back pressure between cars that were fueled with Howell EEE gasoline containing the additive or clear Howell EEE. This test, along with results from the high-speed testing described next, demonstrate that the additive does not cause catalyst plugging. The data summarized in Table 7 also demonstrate that the reductions in $NO_x$ resulting from the practice of this invention are not due to increased back pressure. Thus although $NO_x$ emissions from an engine can be lower if the exhaust back pressure is increased, the fact that there was no significant change in back pressure shows that the reductions in $NO_x$ could not have been caused by increased back pressure and consequent increased exhaust dilution.

TABLE 7

Exhaust Back Pressure Summary Fleet Cars*

| Howell EEE Fuel | | Howell EEE + MMT | |
|---|---|---|---|
| Car Number | B.P.⁻ | Car Number | B.P.⁻ |
| C1 | 7.3 | C2 | 7.4 |
| C4 | 6.9 | C3 | 7.5 |
| C5 | 7.1 | C6 | 7.5 |
| Average | 7.1 | Average | 7.5 |
| D1 | 16.0 | D4 | 15.9 |
| D2 | 15.7 | D5 | 15.5 |
| D3 | 15.8 | D6 | 15.2 |
| Average | 15.8 | Average | 15.5 |
| E2 | 7.6 | E1 | 6.9 |
| E3 | 6.7 | E5 | 6.8 |
| E4 | 7.4 | E6 | 7.4 |
| Average | 7.2 | Average | 7.0 |
| G1 | 8.5 | G3 | 9.2 |
| G2 | 10.1 | G5 | 9.8 |
| G4 | 9.0 | G6 | 9.0 |
| Average | 9.2 | Average | 9.3 |
| H1 | 10.5 | H3 | 10.9 |
| H2 | 10.9 | H4 | 10.8 |
| H5 | 10.8 | H6 | 10.8 |
| Average | 10.7 | Average | 10.8 |
| I1 | 17.0 | I2 | 16.9 |
| I3 | 17.0 | I4 | 17.3 |
| I5 | 17.1 | I6 | 17.6 |
| Average | 17.0 | Average | 17.3 |
| T2 | 16.5 | T1 | 16.6 |
| T3 | 16.7 | T4 | 16.6 |
| T6 | 16.6 | T5 | 16.8 |
| Average | 16.6 | Average | 16.7 |

*Measured at 4500 rpm and wide open throttle after the fleet cars had accumulated 75,000 miles.
⁻Back pressure in inches of mercury.

To determine whether use of the additive under high-speed conditions would cause catalyst plugging, two 5.0 L Model F cars were selected for high-speed testing. This car is equipped with a close-coupled, warm-up catalyst in each bank of its Y-type exhaust system. Close-coupled catalysts are considered susceptible to plugging because hot exhaust gases have had only a minimal opportunity to cool before entering the catalyst, which may cause material to deposit on the catalyst face. See Hurley, *Characterization of Automotive Catalysts exposed to the Fuel Additive MMT*, SAE Paper 890582. Thus, this invention utilizes a condition which the prior art considered heinous and which was sought to be eliminated. Note in this connection, U.S. Pat. Nos. 3,926,581; 3,948,618; 3,950,145; 3,958,955; 4,005,992; 4,005,993; 4,052,171; 4,082,517; and Re. 29,488, the disclosures of which are incorporated herein by reference. It is also worth noting that although the additives of these U.S. patents are not necessary in the practice of this invention, they can be employed if desired.

The cars used for this test had accumulated approximately 15,000 miles in normal rental service prior to this test. After cars were received new catalysts and oxygen sensors were installed prior to starting the test. During the test, one car operated on clear Howell EEE fuel, while the second car used Howell EEE fuel plus the additive at 0.03125 g Mn/gallon.

The driving cycle was based on discussions with car company engineers. The cycle that was used at a test track is shown in Table 8. During the first 25,000 miles, the top speed was 65 mph for approximately 45% of the driving cycle. After completion of the 25,000-mile portion, the car was tuned up and the driving cycle was made more severe. The top speed was raised to 80 mph from the previous level of 65 mph for 10,000 additional miles.

TABLE 8

High-Speed Test Schedule

A. Schedule for first 25,000 miles

| Mile | |
|---|---|
| 0.0 | Leave start position at 15-20 mph. Accelerate to 35 mph. |
| 0.3 | Reduce speed to 15 mph (brake retard) |
| 0.4 | Stop. Accelerate to 55 mph. |
| 1.9 | Slow to 45 mph. Maintain. |
| 3.3 | Accelerate to 65 mph. Maintain. |
| 6.0 | Reduce speed to 35 mph. |
| 6.3 | Reduce speed to 15 mph (brake retard) |
| 6.4 | Stop. Accelerate to 55, mph. etc. |

| Speed, mph | 15 | 35 | 45 | 55 | 65 |
|---|---|---|---|---|---|
| Distance, miles | 0.1 | 0.3 | 1.4 | 1.5 | 2.7 |
| Percent (Approx.) | 2 | 5 | 23 | 25 | 45 |

B. Schedule for additional 10,000 miles

The same schedule was followed except the speed of the 65 mph portion was increased to 80 mph.

To determine if catalyst plugging had occured, exhaust back pressures were measured just ahead of the close-coupled catalysts at wide open throttle and 4,500 rpm. Back pressure on both cars remained constant at 8 psi for both segments of the high-speed testing, indicating no catalyst plugging.

It will be appreciated that in addition to $NO_x$ measurements, the above-described tests also involved measurements of hydrocarbon and carbon monoxide emissions from the cars in the test fleet. The data on hydrocarbon and carbon monoxide emissions are not dealt with herein as this invention is focused primarily on control of $NO_x$ emissions. However, for a full account of the result on hydrocarbon emission (as well as $NO_x$ emissions) see Lenane, *Effect of a Fuel Additive on Emission Control Systems*, SAE Paper 902097, presented at the International Fuels and Lubricants Meeting and Exposition at Tulsa, Okla. of Oct. 22-25, 1990.

Figure 3:
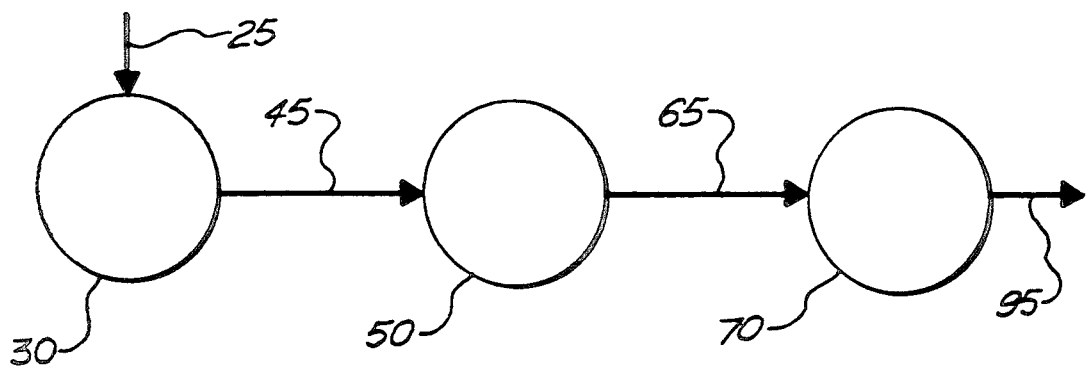
FIG. 3 is a block diagram depicting schematically a combination of this invention.

FIG. 3 schematically depicts a system of this invention. The system is composed of tank 30 containing a supply of gasoline-type fuel of this invention, an internal combustion engine having at least one combustion chamber 50 and an exhaust gas catalyst system 70. Gasoline-type fuel of this invention is periodically introduced into tank 30 as indicated by arrow 25 from an external source (not shown). During engine operation fuel is delivered from tank 30 to combustion chamber 50 as indicated by arrow 45. The exhaust from the combustion in combustion chamber 50 leaves combustion chamber 50 and is delivered as indicated by arrow 65 to exhaust gas catalyst system 70. During this process, a catalyst-enhancing quantity of manganese oxides remains within catalyst system 70. Exhaust gas leaving catalyst system 70 is aspirated as indicated by arrow 95.

By virtue of this invention, after a break-in period, the amount of engine-out nitrogen oxide emissions traveling from combustion chamber 50 to catalyst system 70 is reduced as compared to the amount that would be present in the same system operated on the same fuel devoid of the cyclopentadienyl manganese tricarbonyl compound. Further, because of the presence of the catalyst-enhancing quantity of manganese oxides laid down in catalyst system 70 after a suitable period of continuous or discontinuous engine operation, the amount of nitrogen oxides leaving catalyst system 70 is lower than it would be in the absence of such manganese oxides. Consequently, the amount of $NO_x$ emissions aspirated from the engine (generally referred to as tailpipe emissions) as indicated by arrow 95 is significantly reduced through the summation of the reductions effected in engine-out emissions (arrow 65) and catalyst-out emissions (arrow 95).

What is claimed is:

1. In combination, a spark-ignition internal combustion engine, a supply of liquid fuel for the operation of said engine, and an exhaust gas catalyst for controlling the amount of pollutants released to the environment via the engine exhaust after the exhaust has contacted said catalyst, said combination being characterized in that:
   a) said fuel contains at least one fuel-soluble cyclopentadienyl manganese tricarbonyl compound in an amount equivalent to up to 1/32 gram of manganese per gallon of fuel; and
   b) the $NO_x$ control activity of said catalyst has been enhanced by prior operation of said engine on fuel containing at least one fuel-soluble cyclopentadienyl manganese tricarbonyl compound in an amount equivalent to up to 1/32 gram of manganese per gallon of fuel; such that there is a reduction in the quantity of nitrogen oxides in the exhaust emitted during the operation of said engine.

2. A combination according to claim 1 further characterized in that said catalyst is a three-way catalyst.

3. A combination according to claim 1 further characterized in that said catalyst is a monolithic catalyst.

4. A combination according to claim 1 further characterized in that said catalyst is a three-way monolithic catalyst.

5. A combination according to claim 1 further characterized in that during operation said combination causes a reduction in both engine-out $NO_x$ and catalyst-out $NO_x$ emissions.

6. An automotive vehicle equipped with a spark-ignition internal combustion engine, a supply of liquid fuel for the operation of said engine, and an exhaust gas catalyst for controlling the amount of pollutants in the engine exhaust released to the environment, said fuel containing at least one fuel-soluble cyclopentadienyl manganese tricarbonyl compound in an amount equivalent to up to 1/32 gram of manganese per gallon of fuel, and said vehicle having been previously operated on fuel containing at least one fuel-soluble cyclopentadienyl manganese tricarbonyl compound in an amount equivalent to up to 1/32 gram of manganese per gallon of fuel to enhance the activity of said catalyst in controlling $NO_x$ emissions.

7. A combination according to claim 6 wherein the catalyst is a three-way catalyst and wherein during operation of said vehicle there are reductions in the quantity of engine-out $NO_x$ and in the quantity of tailpipe $NO_x$ emissions.

8. A combination according to claim 6 wherein the catalyst is a monolithic catalyst and wherein during operation of said vehicle there are reductions in the quantity of engine-out $NO_x$ and in the quantity of tailpipe $NO_x$ emissions.

9. A combination according to claim 6 wherein the catalyst is a monolithic three-way catalyst and wherein during operation of said vehicle there are reductions in the quantity of engine-out $NO_x$ and in the quantity of tailpipe $NO_x$ emissions.

10. A method of reducing the quantity of $NO_x$ emitted during the operation of a motor vehicle equipped with a spark-ignition internal combustion engine, an exhaust gas catalyst and a gasoline tank for holding and dispensing to the engine a liquid fuel for use in the operation of the vehicle, which method comprises periodically providing to said tank a supply of liquid fuel containing at least one fuel-soluble cyclopentadienyl manganese tricarbonyl compound in an amount equivalent to up to 1/32 gram of manganese per gallon such that there is a reduction in engine-out $NO_x$, and causing said vehicle to be periodically operated on liquid fuel containing at least one fuel-soluble cyclopentadienyl manganese tricarbonyl compound in an amount equivalent to up to 1/32 gram of manganese per gallon for a cumulative period of time such that there is a reduction in the tailpipe $NO_x$ emissions from said vehicle.

11. A method as claimed in claim 10 wherein said catalyst is a three-way catalyst and said tricarbonyl compound is methylcyclopentadienyl manganese tricarbonyl.

12. A method as claimed in claim 10 wherein said catalyst is a monolithic catalyst and said tricarbonyl compound is methylcyclopentadienyl manganese tricarbonyl.

13. A method as claimed in claim 10 wherein said catalyst is a monolithic three-way catalyst and said tricarbonyl compound is methylcyclopentadienyl manganese tricarbonyl.

14. A method as claimed in claim 10 wherein said vehicle is caused to be periodically operated on liquid fuel containing at least one fuel-soluble cyclopentadienyl manganese tricarbonyl compound in an amount equivalent to up to 1/32 gram of manganese per gallon for at least a cumulative period of time such that the reduction in the tailpipe $NO_x$ emissions from said vehicle becomes at least equivalent to the reduction in engine-out $NO_x$.

15. A method as claimed in claim 10 wherein said catalyst is a monolithic three-way catalyst, wherein said tricarbonyl compound is methylcyclopentadienyl manganese tricarbonyl, and wherein said vehicle is caused to be periodically operated on liquid fuel containing methylcyclopentadienyl manganese tricarbonyl in an amount equivalent to up to 1/32 gram of manganese per gallon for at least a cumulative period of time such that the reduction in the tailpipe $NO_x$ emissions from said vehicle becomes at least equivalent to the reduction in engine-out $NO_x$.

16. A method of reducing the quantity of $NO_x$ emitted during the operation of a motor vehicle equipped with a spark-ignition internal combustion engine and an exhaust gas catalyst, which method comprises operating said vehicle for a cumulative total of at least 5,000 miles on liquid gasoline fuel containing at least one fuel-soluble cyclopentadienyl manganese tricarbonyl compound in an amount equivalent to up to 1/32 gram of manganese per gallon such that there is a reduction in the tailpipe $NO_x$ emissions from said vehicle.

17. A method as claimed in claim 10 wherein said tricarbonyl compound is methylcyclopentadienyl manganese tricarbonyl.

18. A method of reducing the quantity of $NO_x$ emitted during the operation of a population of motor vehicles equipped with gasoline engines and exhaust gas catalysts, which method comprises causing said vehicles to be operated for a cumulative total of over 5,000 miles per vehicle on liquid gasoline fuel containing at least one fuel-soluble cyclopentadienyl manganese tricarbonyl compound in an amount equivalent to up to 1/32 gram of manganese per gallon such that there is an overall reduction in the tailpipe $NO_x$ emissions from said population of vehicles.

19. A method as claimed in claim 18 wherein said tricarbonyl compound is methylcyclopentadienyl manganese tricarbonyl, and wherein at least the majority of said population of vehicles are operated on said liquid gasoline fuel for a cumulative total of over 30,000 miles per vehicle.

20. A method as claimed in claim 18 wherein said tricarbonyl compound is methylcyclopentadienyl manganese tricarbonyl, wherein said population of motor vehicles includes vehicles equipped with a monolithic catalyst, and wherein at least the majority of said population of vehicles are operated on said liquid gasoline fuel for a cumulative total of over 50,000 miles per vehicle.

21. A method as claimed in claim 18 wherein said tricarbonyl compound is methylcyclopentadienyl manganese tricarbonyl, wherein said population of motor vehicles includes vehicles equipped with a three-way catalyst, and wherein at least the majority of said population of vehicles are operated on said liquid gasoline fuel for a cumulative total of over 50,000 miles per vehicle.

22. A method as claimed in claim 18 wherein said tricarbonyl compound is methylcyclopentadienyl manganese tricarbonyl, wherein said population of motor vehicles includes vehicles equipped with a close-coupled catalyst, and wherein at least the majority of said population of vehicles are operated on said liquid gasoline fuel for a cumulative total of over 50,000 miles per vehicle.

23. A method as claimed in claim 20 wherein said monolithic catalyst is a monolithic three-way catalyst.

24. A method as claimed in claim 23 wherein said catalysts further include a close-coupled catalyst.

25. A method as claimed in claim 20 wherein said catalysts further include a close-coupled catalyst.

26. A method as claimed in claim 21 wherein said catalysts further include a close-coupled catalyst.

* * * * *